2,989,495
SOLUTION OF WHOLLY AROMATIC POLYAMIDES IN LIQUID ORGANIC AMINE SOLVENTS
Weston Andrew Hare, Wilmington, Del., and Helen Lyng White, Chadds Ford, Pa., assignors to E. I. du Pont de Nemours and Company, Wilmington, Del., a corporation of Delaware
No Drawing. Filed Aug. 13, 1958, Ser. No. 754,731
9 Claims. (Cl. 260—29.2)

This invention relates to new and useful compositions of matter. More specifically, it relates to solutions of wholly aromatic polyamides in organic solvents.

Wholly aromatic polyamides possess remarkable and highly desirable physical properties including outstanding thermal and chemical stability. These polymers, and methods for preparing them, are described in copending application S.N. 642,928, now abandoned, by Hill, Kwolek, and Sweeny. Unfortunately, these polyamides are insoluble in many well-known organic solvents, and their melting points are so high that they cannot conveniently be processed into useful shapes and forms by melting of the polymeric material. In forming these polymers into independent shaped forms, such as filaments, films, rods, tubes, threads, and the like, or into supported films, coatings, varnishes, paints, lacquers, etc., it would be desirable to use solutions of the polymers but readily available inexpensive solvents utilized in the past have not been suitable for all applications or free of disadvantageous characteristics.

An object of this invention is to provide a novel composition comprising a solution of a high molecular weight wholly aromatic polyamide suitable for the preparation of filaments, films, and the like. Another object is a process for preparing filaments and films from such solutions of wholly aromatic polyamides.

In accordance with this invention wholly aromatic polyamides are dissolved in primary or secondary organic amines. These amines are liquid at room temperature, with a molecular weight not over 150 and with an amine value (A.V.) as defined hereinafter of at least 0.5 and preferably between 0.8 and 1.8. The wholly aromatic polyamides are those disclosed in the above-mentioned application S.N. 642,928, now abandoned, by Hill, Kwolek, and Sweeny. Solutions of these polyamides may be spun into filaments and cast into films using simple, low-temperature spinning and casting techniques, such as are conventionally applied to soluble polymers, such as cellulose acetate, cellulose nitrate, chlorinated polyvinyl chloride, and the like.

The wholly aromatic polyamides of this invention are high molecular weight polymers characterized predominantly by the structural unit

wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymerization.

The high molecular weight polymer of this invention is termed "an aromatic polyamide." This term refers to a polymer wherein repeating units are linked by a carbonamide group, i.e., the

radical, the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. The term "aromatic ring" means a carbocyclic ring possessing resonance. Exemplary aromatic radicals have the following structural formulas

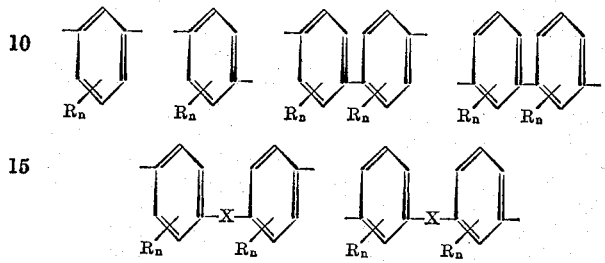

in which R is preferably a lower alkyl, lower alkoxy, or halogen group, $n$ is a number from 0–4, inclusive, and X is preferably one of the groups of

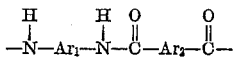

and —O—, in which Y is a hydrogen or a lower alkyl group. X may also be a lower alkylene or lower alkylene dioxy group although these are somewhat less desirable. R may also be a nitro, lower carbalkoxy, or other non-polyamide-forming group. All of these aromatic radicals are divalent and meta or para oriented, that is, the unsatisfied bonds of the radicals (the "chain-extending bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. Preferable, however, are high molecular weight polymers in which the aromatic radicals are unsubstituted or contain only lower alkyl groups attached to any one ring. The term "non-polyamide-forming groups" refers to groups which do not form polyamides during the polymerization reaction herein disclosed.

High molecular weight polymers of this invention are prepared by reacting an aromatic di-acid chloride with an aromatic diamine, the acid groups of the di-acid chloride and the amine groups of the diamine being meta or para oriented relative to each other, at low temperatures (below 100° C.).

The di-acid chloride of the dibasic aromatic acid useful as a reactant in the polymerization of the present invention includes compounds of the formula

wherein $Ar_2$ is a divalent aromatic radical, i.e., it contains resonant unsaturation, and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing less than five carbon atoms.

Di-acid chlorides which may be utilized to prepare the polyamides of this invention include isophthaloyl chloride and lower alkyl isophthaloyl chlorides such as methyl-, ethyl-, propyl-, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. The total number of carbon atoms in the substituents attached to the aromatic ring should not exceed nine. It is not necessary that all of the alkyl substituent groups be the same because compounds such as 2-methyl-4-ethyl isophthaloyl chloride and 2-methyl-4-ethyl-5-propyl isophthaloyl chloride may be utilized, the total number of carbon atoms in all the substituent groups (non-polyamide-forming groups) attached to the aromatic ring in the latter two compounds being 3 and 6, respectively. In place of an alkyl group, the aromatic ring in isophthaloyl chloride may be substituted with one or more lower alkoxy groups such as, for example, methoxy-, ethoxy-, propoxy-, butoxy-, etc., isophthaloyl chlorides. As with alkyl-substituted isophthaloyl chlorides it is desirable that the total number of carbon atoms in the alkoxy groups attached to the aromatic ring be less than about five, but it is not necessary that all of the alkoxy groups be the same. Representative of such compounds are dimethoxy-, trimethoxy-, tetramethoxy-, and diethoxy-isophthaloyl chlorides, and 2-methoxy-4-ethoxy isophthaloyl chloride. Halogen-substituted isophthaloyl chlorides as exemplified by chloro-, bromo-, and fluoro-isophthaloyl chlorides may be used. More than one halogen may be attached to the aromatic ring and di-halo isophthaloyl chlorides, such as dichloro-, dibromo-, difluoro-, or chlorobromo-, chlorofluoro-isophthaloyl chlorides are useful as are similar tri-halo and tetra-halo isophthaloyl chlorides. The halogens in these compounds may be the same or different as in the case of the di-halo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups so long as the total number of carbon atoms in the substituents attached to the aromatic ring does not exceed nine. Thus, it will be apparent that the aromatic radical of the isophthaloyl chloride may contain one or more or any combination of lower alkyl, lower alkoxy, halogen, nitro, phenyl, lower carbalkoxy, or other non-polyamide-forming groups.

In addition to isophthaloyl chlorides and substituted isophthaloyl chlorides specified above, corresponding unsubstituted and substituted terephthaloyl chloride may also be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed nine. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc., terephthaloyl chlorides, chloro-, bromo-, dichloro-, chlorobromo-, etc., terephthaloyl chlorides, and nitro and lower carbalkoxy-terephthaloyl chlorides.

In addition to the single ring diacid chlorides specified above, multiple ring diacid chlorides in which the acid chloride groups are oriented meta or para with respect to each other are also useful in this invention. Exemplary of such compounds are 4,4'-oxydibenzoyl chloride, 4,4'-sulfonyldibenzoyl chloride, 4,4'-dibenzoyl chloride, 3,3'-oxydibenzoyl chloride, 3,3'-sulfonyldibenzoyl chloride, and 3,3'-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

The diamines useful as reactants in forming the polymer of this invention are compounds of the formula $H_2N—Ar_1—NH_2$ wherein $Ar_1$ is a divalent aromatic radical as defined above and the $NH_2$ groups are oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy as mentioned above. The aromatic nucleus of the diamines may be identical to any of the aromatic radicals mentioned above for the diacid chlorides, and the diamine utilized in any given instance may contain the same or different aromatic radical as the diacid chloride utilized. The total number of carbon atoms in the substituent groups attached to any aromatic ring should not exceed nine.

Exemplary diamines which may be utilized in this invention include meta-phenylene diamine and lower alkyl substituted meta-phenylene diamine such as methyl-, ethyl-, propyl-, etc., meta-phenylene diamine. There may be more than one alkyl group attached to the aromatic ring as in the case of dimethyl, trimethyl, tetramethyl, diethyl, triethyl, and triisopropyl meta-phenylene diamine. The alkyl substitutent groups need not be the same because compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy-, ethoxy-, propoxy-, butoxy-, etc., meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenlylene diamine as exemplified by chloro, bromo, and fluoro meta-phenylene diamine may be utilized. More than one halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups so long as the total number of carbon atoms in the substituents attached to an aromatic ring does not exceed nine.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring so long as the total numer of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4'-oxydiphenyldiamine, 4,4'-sulfonyldiphenyldiamine, 4,4'-diphenyldiammine, 3,3'-oxydiphenyldiamine, 3,3'-sulfonyldiphenyldiamine, and 3,3'-diphenyldiamine, and the corresponding compounds in which one or both of the aromatic rings contains one or more or a combination of lower alkyl, lower alkoxy, halogen, nitro, sulfonyl, lower carbalkoxy groups and the total number of carbon atoms in the substituent groups attached to an aromatic ring does not exceed nine.

A diamine and diacid chloride are reacted in accordance with this invention to produce a high molecular weight linear polyamide having a structural unit corresponding to the diamine and diacid chloride utilized. For example, para-phenylenediamine reacts with isophthaloyl chloride to produce a polymer characterized by the following structural unit

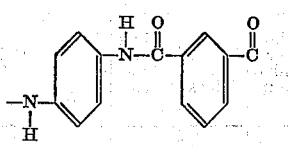

and having an inherent viscosity greater than about 0.6. Similarly, other diamines and diacid chlorides react to produce polyamides with corresponding aromatic nuclei. The structure of the polyamide is indicated by the fact that in accordance with this invention two aromatic bifunctional reactants (aromatic diacid halide and aromatic diamine) combine in equivalent amounts under very mild reaction conditions to form a polymer that is dissolved and unchanged in unreactive solvents, and is orientable and generally crystallizable in film and fiber form. The structure of the polymer is confirmed by infra red spectra analysis.

In preparing the polymers of this invention two or more aromatic diamines or two or more aromatic diacid compounds of the structures already described can be employed in place of a single diamine and single dibasic acid compound. In addition, up to about 10% polymer-forming ingredients which may or may not contain an aromatic nucleus can be included without seriously detracting from the extraordinary physical and chemical properties of the polymers of this invention. Preferably, however, the diamine and diacid compounds utilized will be wholly aromatic, thus resulting in a polymer characterized entirely by structural units with all of the nuclei containing aromatic radicals.

Polymers of this invention are characterized by an exceptionally high melting point. Whereas known polyamides melt at temperatures below about 270° C., generally the polyamides of this invention have melting points in excess of 300° C. and in many instances above 350° C. Moreover, filaments of polyamides of this invention retain their filament form at temperatures of about 300° C. Polymers of this invention are also distinguished from known polyamides in having water-white color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures and are readily crystallizable.

Preferably, solutions of this invention contain, in addition to the polymer and the amine solvent, between about 3% and about 20% by weight of an additive such as water or hydrogen chloride, based on the sum of amine and additive. The presence of such an additive increases the solvent power of the amine and gives a solution of greater thermal stability. In the most desirable embodiment of the invention, both hydrogen chloride and water are present simultaneously, but either additive can be present separately without the other. The preferred upper limit of concentration for each additive when utilized alone is less than the total concentration of the two when used together. The desirable upper limit in any case is calculated by dividing the figure 30% by the number of atoms in the additive molecule. Thus, for water, $H_2O$, containing three atoms $30 \div 3 = 10\%$, and 10% water is the preferred upper limit. For hydrogen chloride, HCl, there are two atoms in the molecule, and $30 \div 2 = 15\%$, so up to 15% hydrogen chloride is useful. Thus, the solvent portion of the solution may contain up to 20% total additives by weight, and this 20% may consist of up to 15% hydrogen chloride and up to 10% water.

The amine value of any amine depends on the number and type of amino radicals present, the presence or absence of rings in the structure, the kind of ring, and the number of carbon atoms present. The only amines referred to in this description are stable amines, with melting points below 35° C., in which the amino group or groups are attached to carbon atoms which, in turn, are attached only to carbon, nitrogen or hydrogen atoms. Amides, imides and similar structures containing an $-NH_2$ or $>NH$ group not so attached are not useful in the present invention. Amine value is computed in the following manner:

(1) Add points for all the amino groups present, counting:

(a) 2 points for each primary $-NH_2$.
(b) 2 points for each secondary $-NH-$.
(c) 0 points for each tertiary

(d) Only amino groups attached to C attached to C, H, or N are considered.

(2) To the above sum add 3 points for any 5-membered saturated ring containing only carbon and nitrogen atoms, but do not add any points for any other type of ring.

(3) From the above sum, subtract 2 points if any atom is present other than carbon, hydrogen and nitrogen, i.e., sulfur, oxygen, etc., or if any unsaturation is present.

(4) Divide the above total by a number which is one greater than the total number of carbon atoms in the amine molecule.

Accordingly, the effective value of an amine is given by the formula, $$A.V. = \frac{2n_1 + 3n_2 - 2n_3}{1 + n_4}$$

wherein $n_1$ is the total number of primary and secondary amino groups on carbon atoms of the amine which carbon atoms are attached only to members of the group consisting of carbon, hydrogen and nitrogen, $n_2$ is the number of 5-membered saturated rings containing only carbon and nitrogen atoms, $n_3$ is an integer from 0 to 1 which has a value of zero only when the amine is solely composed of saturated carbon, hydrogen and nitrogen atoms, and $n_4$ is the total number of carbon atoms in the amine molecule. Table I below illustrates computation of amine values for representative amines, and correlates amine values with a qualitative estimate of solvent power for the aromatic polyamide poly(meta-phenylene isophthalamide).

Amine solvents of this invention must have an amine value of at least 0.7. Addition of hydrogen chloride to solutions of this invention renders the solutions much more stable thermally, so that further processing steps, such as spinning filaments or casting films, can be carried out under a wider range of conditions. In addition, the presence of the resulting hydrogen chloride amine salt tends to raise the effective amine value (A.V.) of moderately effective amines. Amines which have an amine value in the range of 0.5 to 0.9 (without additive) will have their solvent power for wholly aromatic polyamides increased by the addition of hydrogen chloride or water so that they have an apparent A.V. of 0.8 to 1.3, while amines having an A.V. of 1.0 to 1.8 will show the effect of the additive chiefly in terms of increased thermal stability. Since both of these results are desirable, the preferred embodiment described herein has multiple advantages.

TABLE I
*Computation of amine values*

| Formula | Points For Amino Groups | Points For Rings | Points To Be Subtracted | Number of Carbon Atoms Plus 1 | Calculated Amine Value | Observed Solvent Power |
|---|---|---|---|---|---|---|
| Methyl Amine $CH_3$—$NH_2$ | 2 | 0 | 0 | 2 | $\frac{2}{2}=1.0$ | Good. |
| Ethylene Diamine $NH_2$—$CH_2$—$CH_2$—$NH_2$ | 4 | 0 | 0 | 3 | $\frac{4}{3}=1.33$ | Do. |
| Triethylene Tetramine $NH_2$—$(CH_2)_2$—$NH$—$(CH_2)_2$—$NH$—$(CH_2)_2$—$NH_2$ | 8 | 0 | 0 | 7 | $\frac{8}{7}=1.14$ | Do. |
| Dimethyl Amine $CH_3$—$NH$—$CH_3$ | 2 | 0 | 0 | 3 | $\frac{2}{3}=0.67$ | Fair. |
| Pyrrolidine $CH_2$—$CH_2$—$CH_2$—$CH_2$—$NH$ | 2 | 3 | 0 | 5 | $\frac{5}{5}=1.00$ | Good. |
| Pyridine (ring structure) | 0 | 0 | 2 | 6 | $\frac{1}{3}=-0.33$ | Poor. |
| Piperidine (ring structure) | 2 | 0 | 0 | 6 | $\frac{2}{6}=0.33$ | Do. |

Amines with an A.V. of less than 0.5 are poor solvents for aromatic polyamides but their solvent power can be improved by the addition of hydrogen chloride and water. The utility of particular amines as solvents for wholly aromatic polyamides and the improvements effected by incorporating a minor amount of additive in the amine solution are illustrated in Tables II and III where characteristics of solutions of a number of wholly aromatic polyamides in several different amine solvents with and without additives are given. Solubility of the polymer in the solvent or solvent mixture is indicated along with the temperature at which the solution is prepared and heat stability of the solution.

Heat stability is a very important factor in the employment of solutions of high molecular polymers under many circumstances. It is frequently possible to obtain a reasonably high solids content solution at a low temperature, but when a moderate degree of heating is applied to this solution, the polymer tends to gel or precipitate and thus render the solution unsuited for processing the polymer into shaped forms and the like. The preferred amine solvents of the present invention give polymer solutions of satisfactory heat stability. It should be noted that with some of the solvents, particularly the very low boiling ones such as methylamine, it is not desirable to warm the solutions, due not only to lack of sufficient stability but also because the boiling point of the amine would be exceeded by raising the temperature too much. When such solutions are placed under pressure, heat may be applied to test stability. In the tables a polymer solution of fair heat stability is considered as one which a polymer concentration of 10% by weight can be heated to 30° C. without formation of polymer precipitate or gel. A polymer solution with good heat stability can be heated and maintained at a temperature of at least 30° C. or within 5° of its boiling point in those cases where the boiling point was below 30° C. for a period of at least ten hours without the formation of polymer precipitate or gel while a polymer solution of excellent stability could be heated to a temperature of at least 50° or higher or to a temperature 10° C. higher than the boiling point of the pure solvent in those cases where the latter value was below 50° C. and held for extended periods of time without the formation of polymer precipitate or gel. Under many circumstances, solutions of high molecular weight wholly aromatic polyamides will be found to be suitable for further processing at temperatures in the neighborhood of 30° C. However, under some circumstances, a temperature of 50° C. or higher may be useful. As already indicated, the presence of the hydrogen chloride and water in the preferred embodiment of this invention leads to polymer solutions of increased thermal stability.

Amines of this invention having an amine value of at least 0.65 and preferably 0.8 to 1.8 may be used as sole solvents in preparing solutions of this invention while amines with amine values of 0.5 to 0.65 require an additive (either water or hydrogen chloride or both) when utilized as solvents.

TABLE II

| Solvent System | Amine Value of Amine | Mol. wt. and boiling point of Amine | Poly(metaphenylene isophthalamide) | | |
|---|---|---|---|---|---|
| | | | Polymer Concentration [1] | Temp., °C. | Heat Stability |
| Methyl Amine | 1.0 | 31 / 6.5° C | 25% | −20 | Good. |
| Methyl Amine+5% HCl | 1.0 | 31 | 25% | −20 | Excellent. |
| Pyrrolidine | 1.0 | 71 / 88.5° C | 25% | 20 | Fair. |
| Pyrrolidine+11% HCl | 1.0 | 71 | 25% | 30 | Excellent even at 75° C. |
| Pyrrolidine+5% HCl+5% $H_2O$ | 1.0 | 71 | 25% | 30 | Do. |
| Cyclohexylamine | 0.33 | 99 / 134° C | 2% | 20 | Very Poor. |
| Triethylene tetramine | 1.14 | 146 | 25% | 50 | Excellent. |
| Diethylamine | 0.40 | 73 / 55.5° C | Swollen given polymer only. | −10 | Very Poor. |
| Dimethylamine+5% HCl+5% $H_2O$ | 0.67 | 45 / 7.4° C | 25% | −10 | Excellent at −10° C. |

[1] On weight basis.

TABLE III

*Solubility of polyamide produced from bis(4-amino phenyl) sulfone and isophthaloyl chloride*

| Solvent System | Temperature, °C. | Amount of Polymer, Percent | Behavior |
|---|---|---|---|
| Ethyl Amine (alone) | 0 | 10 | Insoluble. |
| Ethyl Amine (91 parts) +Water (7 parts) +HCl (2 parts) | 0 | 10 | Clear Solution. |
| Ethyl Amine (96.5 parts) +HCl (3.5 parts) | 0 | 10 | Do. |

In addition to highly concentrated solutions of polymer suitable for solution spinning, the present invention provides compositions containing wholly aromatic polyamides which are useful for quite different purposes. Thus, compositions containing a secondary amine solvent, up to 10% of adjuvant comprising water or hydrogen chloride or both, and up to 50% by weight of a wholly aromatic polyamide are stable, high viscosity, gummy solutions suitable for extrusion shaping, provided that these gum solutions are kept at a temperature below 0° C. This aspect of the present invention is illustrated in an example below.

EXAMPLE I

Poly(metaphenylene isophthalamide) having an inherent viscosity of 1.7 is dissolved in a mixture of 83 parts of pyrrolidine, 8.5 parts of water and 8.5 parts of hydrogen chloride. This solution, having a solids content of 24%, is spun through a 30-hole spinneret into an air chamber containing air heated to 160° C. Filaments, thus produced, are wound up continuously at the rate of 100 y.p.m. and drawn to about 4 times their original length and tested. The drawn filaments have a tenacity of about 4 g.p.d. and an elongation of about 20% at the break. These filaments are suitable for end uses similar to those described in copending application S.N. 642,928, referred to above.

EXAMPLE II

Following the procedure of Example I, poly(metaphenylene isophthalamide) is dissolved in triethylene tetramine to the extent of 25% by weight and the solution spun at 30° C. through a 20-hole spinneret to form continuous filaments which are wound at the speed of 100 y.p.m. After drawing, the filaments have a tenacity of 3.5 g.p.d. and an elongation of 18% at the break.

EXAMPLE III

A solution of poly(metaphenylene isophthalamide) made up of 25 parts of polymer, 68.2 parts of ethylamine, and 6.8 parts of ethylamine hydrochloride is extruded through a spinneret cooled to 10° C. having 20 holes (.005" hole diameter) at a rate of 2.1 grams of solution per minute. The freshly formed filaments pass through 8 feet of air at a temperature of about 22° C. and are wound up at 10 y.p.m. After washing free of soluble material, the filaments are drawn 6.5× over a plate heated to 230°. The resulting yarn has good luster, 3.7 g.p.d. tenacity, 18% elongation, and 86 g.p.d. initial modulus.

EXAMPLE IV

Separate solutions of poly(metaphenylene isophthalamide) are prepared in (*a*) 100% pyrrolidine, (*b*) a mixture of 90 parts pyrrolidine and 10 parts HCl, (*c*) a mixture of 90 parts pyrrolidine and 10 parts H₂O, and (*d*) a mixture of 80 parts pyrrolidine, 10 parts HCl and 10 parts H₂O. In each case, the polymer content is 25%. Solution (*a*) is stable at 30° C. for less than one hour before gelation set in. Solution (*b*) is stable at 30° C. for a matter of days, and at 75° C. for several hours. Solution (*c*) is stable at 30° C. for several hours. Solution (*d*) is even more stable than solution (*b*).

EXAMPLE V

This example illustrates preparation of a high-solids-content gum solution. 10 parts by weight of poly(metaphenylene isophthalamide), 84.6 parts of dimethylamine, 2.7 parts of water, and 2.7 parts of hydrogen chloride are mixed at −10° C. The polymer dissolves in a portion of the solvent to form a clear gum solution of very high viscosity. The remaining portion of the solvent is present as a thin separate phase. The two phases are separated, and the gum solution is found to contain 35% polymer by weight. This solution can be extruded through a spinneret cooled to −10° C. into air at 20° C. The resulting filaments are wound up at 10 yards per minute, washed and drawn to provide yarn of good appearance and with physical properties comparable to those described in Example III.

The claimed invention:

1. A solution of a wholly aromatic polyamide characterized by the recurring structure unit

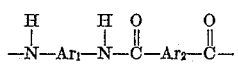

wherein $Ar_1$ and $Ar_2$ are divalent aromatic radicals in which the chain-extending bonds, connecting $Ar_1$ and $Ar_2$ to nitrogen atoms and carboxy groups, respectively, are attached to non-adjacent carbon atoms in these aromatic rings, said polymer having an inherent viscosity of at least 0.6 in concentrated sulfuric acid at 30° C. at a concentration of 0.5% by weight, said solution being in a liquid organic amine having at least one hydrogen atom attached to the amine nitrogen, having a molecular weight less than about 150 and an amine value of at least about 0.5 computed from the formula, $$\frac{2n_1 + 3n_2 - 2n_3}{1 + n_4}$$

wherein $n_1$ is the total number of primary and secondary amino groups on carbon atoms of the amine which carbon atoms are attached only to members of the group consisting of carbon, hydrogen and nitrogen, $n_2$ is the number of 5-membered saturated rings containing only carbon and nitrogen atoms, $n_3$ is an integer from 0 to 1 which has a value of zero only when the amine is solely composed of saturated carbon, hydrogen and nitrogen atoms, and $n_4$ is the total number of carbon atoms in the amine molecule.

2. The solution of claim 1 in which the polyamide is poly(metaphenylene isophthalamide).

3. The solution of claim 1 containing up to about 15% hydrogen chloride by weight based upon total liquids.

4. The solution of claim 3 in which the polyamide is poly(metaphenylene isophthalamide).

5. The solution of claim 1 containing up to about 10% water by weight based upon total liquids.

6. The solution of claim 5 containing up to about 15% hydrogen chloride by weight based upon total liquids.

7. The solution of claim 1 containing up to 15% hydrogen chloride by weight and up to 10% water by weight, the total weight of hydrogen chloride and water not exceeding 20% by weight based upon total liquids.

8. The solution of claim 7 in which the polyamide is poly(metaphenylene isophthalamide).

9. The solution of claim 1 in which the amine has an amine value between about 0.8 and about 1.8.

References Cited in the file of this patent

UNITED STATES PATENTS

| 2,756,221 | Caldwell | July 24, 1956 |
| 2,831,834 | Magat | Apr. 22, 1958 |

OTHER REFERENCES

Patent Office Practice, McCrady, Third Edition, copyright 1946 and 1950, Husting Printing Company, Section 90, pages 121 and 122.